United States Patent
Simpson et al.

(10) Patent No.: US 7,754,279 B2
(45) Date of Patent: Jul. 13, 2010

(54) ARTICLE COATED WITH FLASH BONDED SUPERHYDROPHOBIC PARTICLES

(75) Inventors: John T Simpson, Clinton, TN (US); Craig A Blue, Knoxville, TN (US); James O Kiggans, Jr., Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 214 days.

(21) Appl. No.: 12/025,932

(22) Filed: Feb. 5, 2008

(65) Prior Publication Data

US 2009/0196990 A1    Aug. 6, 2009

(51) Int. Cl.
*B05D 1/12* (2006.01)

(52) U.S. Cl. .................. 427/203; 427/202; 427/204; 427/271

(58) Field of Classification Search ......... 427/201–205, 427/271
See application file for complete search history.

(56) References Cited

U.S. PATENT DOCUMENTS

| | | | |
|---|---|---|---|
| 3,931,428 A | 1/1976 | Reick | |
| 4,377,608 A | 3/1983 | Daudt et al. | |
| 5,437,894 A | 8/1995 | Ogawa et al. | |
| 6,235,383 B1 | 5/2001 | Hong et al. | |
| 6,653,255 B2 * | 11/2003 | Shiuh et al. | 502/412 |
| 6,800,354 B2 | 10/2004 | Baumann et al. | |
| 6,872,441 B2 | 3/2005 | Baumann et al. | |
| 7,258,731 B2 | 8/2007 | D'Urso et al. | |
| 7,524,531 B2 * | 4/2009 | Axtell et al. | 427/226 |
| 2002/0142150 A1 * | 10/2002 | Baumann et al. | 428/328 |
| 2002/0150725 A1 | 10/2002 | Nun et al. | |
| 2003/0013795 A1 * | 1/2003 | Nun et al. | 524/442 |
| 2006/0024508 A1 | 2/2006 | D'Urso et al. | |
| 2006/0099397 A1 | 5/2006 | Thierauf et al. | |
| 2006/0110541 A1 | 5/2006 | Russell et al. | |
| 2006/0246297 A1 * | 11/2006 | Sakoske et al. | 428/426 |
| 2006/0257643 A1 | 11/2006 | Birger | |
| 2006/0263516 A1 | 11/2006 | Jones et al. | |
| 2006/0275595 A1 | 12/2006 | Thies et al. | |
| 2007/0009657 A1 | 1/2007 | Zhang et al. | |
| 2009/0011222 A1 * | 1/2009 | Xiu et al. | 428/323 |

FOREIGN PATENT DOCUMENTS

| | | | |
|---|---|---|---|
| EP | 0 927 748 | * | 7/1999 |
| JP | 2000144116 A | | 5/2000 |
| JP | 2001207123 A | | 7/2001 |

\* cited by examiner

*Primary Examiner*—Frederick J Parker
(74) *Attorney, Agent, or Firm*—Novak Druce + Quigg LLP; Gregory A. Nelson; Gregory M. Lefkowitz

(57) ABSTRACT

A method of making article having a superhydrophobic surface includes: providing a solid body defining at least one surface; applying to the surface a plurality of diatomaceous earth particles and/or particles characterized by particle sizes ranging from at least 100 nm to about 10 μm, the particles being further characterized by a plurality of nanopores, wherein at least some of the nanopores provide flow through porosity, the particles being further characterized by a plurality of spaced apart nanostructured features that include a contiguous, protrusive material; flash bonding the particles to the surface so that the particles are adherently bonded to the surface; and applying a hydrophobic coating layer to the surface and the particles so that the hydrophobic coating layer conforms to the nanostructured features.

11 Claims, 5 Drawing Sheets

ARTICLE COATED WITH FLASH BONDED SUPERHYDROPHOBIC PARTICLES

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

CROSS-REFERENCE TO RELATED APPLICATIONS

The following U.S. patents and U.S. patent applications are specifically referenced and incorporated herein by reference:

U.S. Pat. No. 7,258,731 issued on Aug. 21, 2007 to Brian R. D'Urso, et al. entitled "Composite, Nanostructured, Super-Hydrophobic Material."

U.S. patent application Ser. No. 11/749,852 filed on May 17, 2007 by Brian D'Urso, et al. entitled "Super-Hydrophobic Water Repellant Powder."

U.S. patent application Ser. No. 11/777,486 filed on Jul. 13, 2007 by John T. Simpson, et al. entitled "Superhydrophobic Diatomaceous Earth."

BACKGROUND OF THE INVENTION

Superhydrophobic surfaces are currently formed on various materials such as polymers and plastics by roughening the surface and coating a fluorinated polymer thereon. The problem with such an approach is the final superhydrophobic quality of the material is inadequate for many applications (contact angle<150 deg).

Other methods include formation of a superhydrophobic metal surface by sulfur-induced morphological development. A copper alloy undergoes electro chemical reaction on to produce a superhydrophobic surface (contact angle>160 deg.)

BRIEF SUMMARY OF THE INVENTION

In accordance with one aspect of the present invention, the foregoing and other objects are achieved by a method of making article having a superhydrophobic surface that includes the following steps:

a. providing a solid body defining at least one surface;

b. applying to the surface a plurality of particles characterized by particle sizes ranging from at least 100 nm to about 10 μm, the particles being further characterized by a plurality of nanopores, wherein at least some of the nanopores provide flow through porosity, the particles being further characterized by a plurality of spaced apart nanostructured features that include a contiguous, protrusive material;

c. flash bonding the particles to the surface so that the particles are adherently bonded to the surface; and d. applying a hydrophobic coating layer to the surface and the particles so that the hydrophobic coating layer conforms to the nanostructured features.

In accordance with another aspect of the present invention, a method of making article having a superhydrophobic surface includes the following steps:

a. providing a solid body defining at least one surface;

b. applying to the surface a plurality of porous diatomaceous earth particles;

c. flash bonding the porous diatomaceous earth particles to the surface so that the porous diatomaceous earth particles are adherently bonded to the surface; and d. applying a hydrophobic coating layer to the surface and the porous diatomaceous earth particles so that the hydrophobic coating layer conforms to the surface and to the porous diatomaceous earth particles.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention utilize powders that have surface features that can be made superhydrophobic and embed them into the surface of the solid (substrate) material. Particulate (powder) grains are both firmly embedded into the substrate and also exposed to the outer surface, then coated with a hydrophobic material to make the surface rough, durable, and superhydrophobic.

Particles used to make superhydrophobic water repellant powder and superhydrophobic diatomaceous earth as described in the patent applications referenced hereinabove are particularly suitable particles for carrying out the present invention. U.S. patent application Ser. No. 11/749,852 describes a plurality of solid particles characterized by particle sizes ranging from at least 100 nm to about 10 μm having a plurality of nanopores that provide flow through porosity. The surface of the particles displays a plurality of spaced apart nanostructured features comprising a contiguous, protrusive material. U.S. patent application Ser. No. 11/777,486 describes suitable forms of diatomaceous earth particles. Particles from each of the referenced patent applications can be used alone or in combination with each other or with other materials that will not have a deleterious effect on the hydrophobicity of the final product.

The particles are primarily comprised of amorphous silicon dioxide and as such are highly heat resistant, withstanding temperatures up to about 900° C. before any localized melting begins to occur.

As described in the referenced patent applications, the particles are superhydrophobic only after a hydrophobic coating layer is applied thereto. Prior to such application, the uncoated particles are hydrophilic. It was discovered that the uncoated, hydrophilic particles can be bonded to a surface and subsequently coated with a hydrophobic coating layer to make the surface superhydrophobic.

The method of the present invention is applicable to any substrate composition that has a melting point below that of the particles. Some examples of suitable substrate compositions include but are not limited to glass, metals, metal alloys, polymers, and composites of any of the foregoing. Moreover, suitable substrates also include but are not limited to thin-film coatings, thick-film coatings, organic coatings, and the like.

Figure 1:
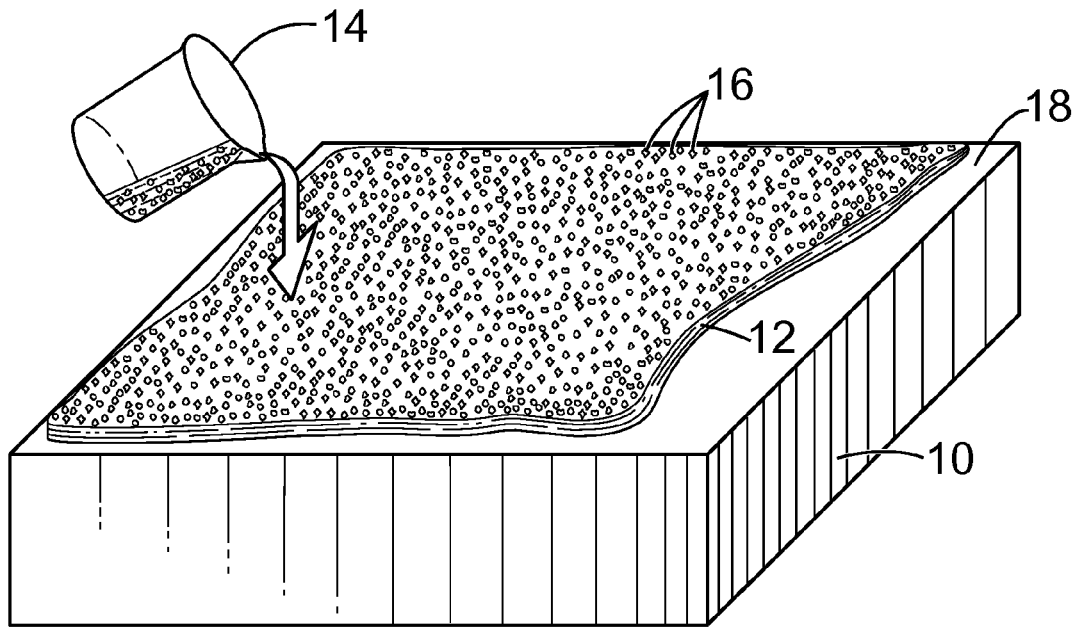
FIG. 1 is a schematic view of a substrate being coated with a slurry of particles in accordance with an aspect of the present invention.
Figure 2:
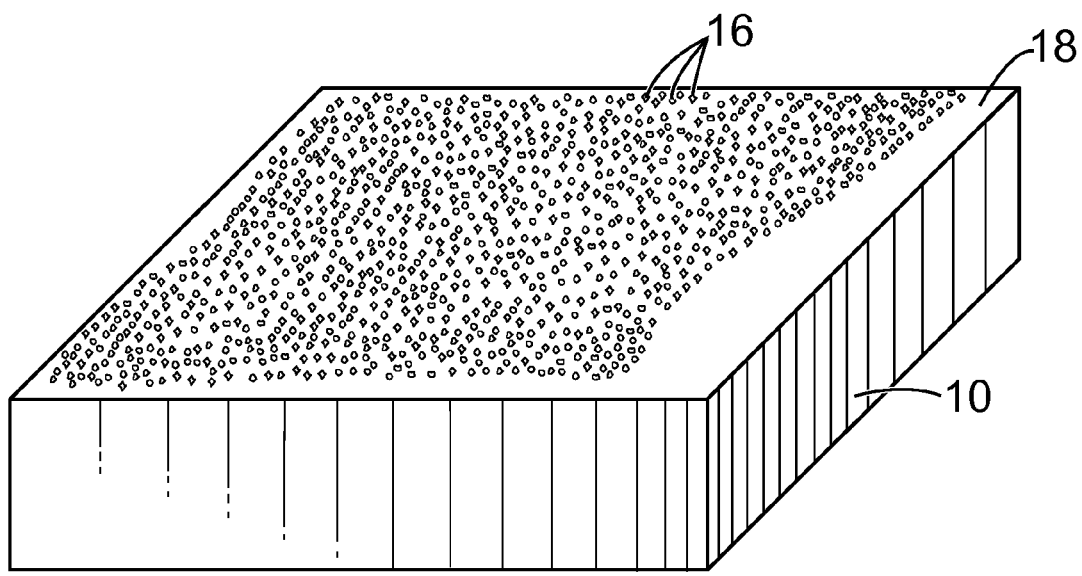
FIG. 2 is a schematic view of a substrate having a coating of particles in accordance with an aspect of the present invention.

The substrate is first coated with the particles by any conventional means for applying particles to a surface. For example, referring to FIG. 1, a surface 18 of a substrate 10 can be coated with a mixture such as, for example, slurry, paint, ink, or film, 12 comprising the uncoated particles 16 and an appropriate fluid vehicle such as alcohol and/or water, for example. The mixture 12 can be applied by any conventional coating method, including but not limited to direct application from a container 14, spraying, painting, rolling, stamping, dip-coating, and the like. Referring to FIG. 2, the vehicle is subsequently volatilized and the particles 16 remain on the surface 18.

Figure 3:
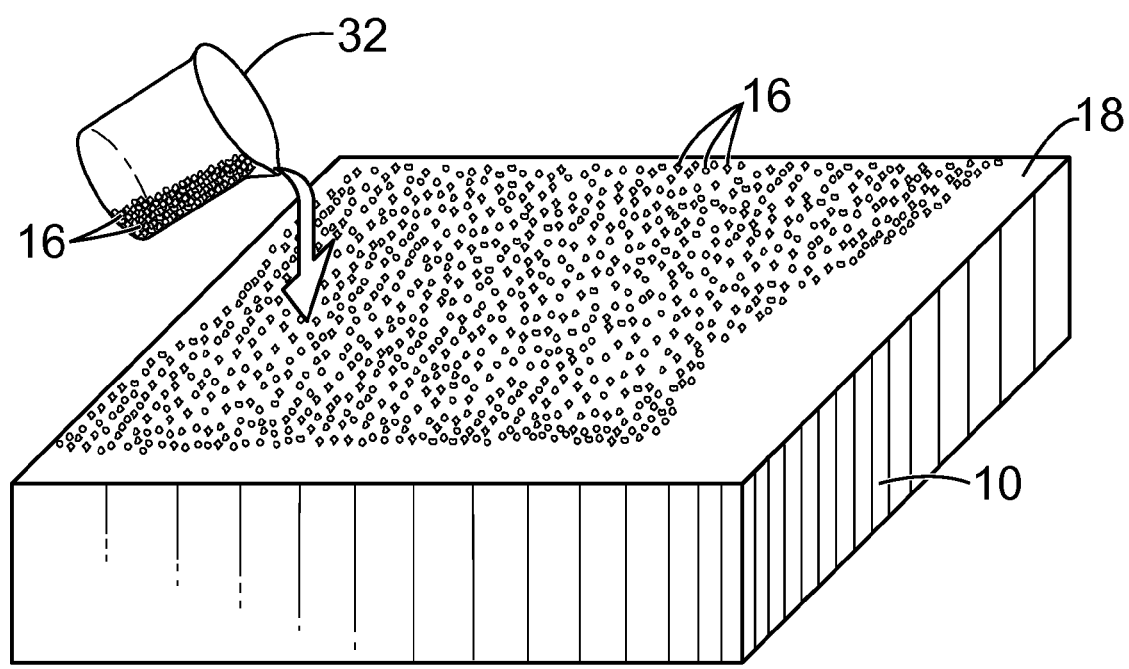
FIG. 3 is a schematic view of a substrate being coated with dry particles in accordance with an aspect of the present invention.

Moreover, referring to FIG. 3, a surface 18 of a substrate 10 can be dry-coated with particles 16 by means such as direct application from a container 32, electrostatic spraying, dry-brushing, and the like.

Figure 4:
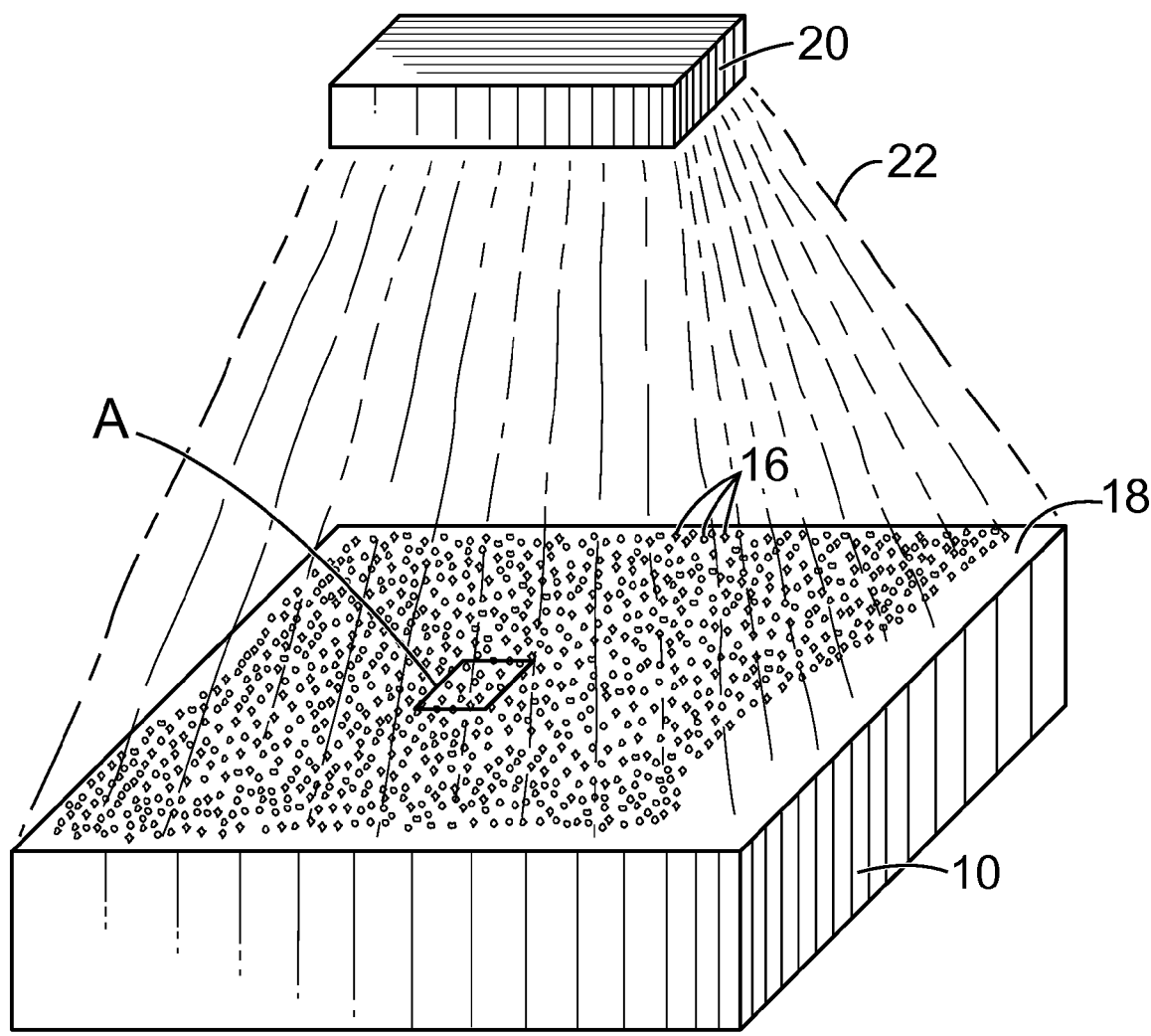
FIG. 4 is a schematic view of the substrate shown in FIG. 2 undergoing flash bonding of the particles into the surface in accordance with an aspect of the present invention.

Referring next to FIG. 4, the particles 16 are flash bonded to the surface 18. Flash bonding can be defined for the purposes of the present invention as a process whereby the surface 18 (and usually also the particles 16) is rapidly heated to the melting point and/or softening point of the substrate 10 so that the particles 16 are adherently bonded to the surface 18. It is important that the heating be controlled to a depth that is sufficient to achieve the bonding, but minimally deleterious to the integrity of the substrate material.

Flash bonding can involve a physical bond, a chemical bond, or a combination of both. In the case of a physical bond, for example, the particles 16 can be at least partially embedded into the surface 18.

Flash bonding can be accomplished by any suitable means for heating the surface 18 while controlling (limiting) the depth to which the heat penetrates the substrate 10. The skilled artisan will recognize that depth limitation is generally accomplished by controlling the rapidity of the heating process. The more rapidly the surface is heated, the faster the surface 18 will be heated to the necessary temperature to achieve flash bonding. The heating process can then be terminated before the heat can penetrate into the substrate 10 sufficiently to have any significant deleterious effect on the integrity of the substrate 10.

Referring again to FIG. 4, one suitable means for heating the surface 18 is an infrared (IR) flash-lamp 20 that emits IR energy 22 that heats the surface 18.

Figure 5:
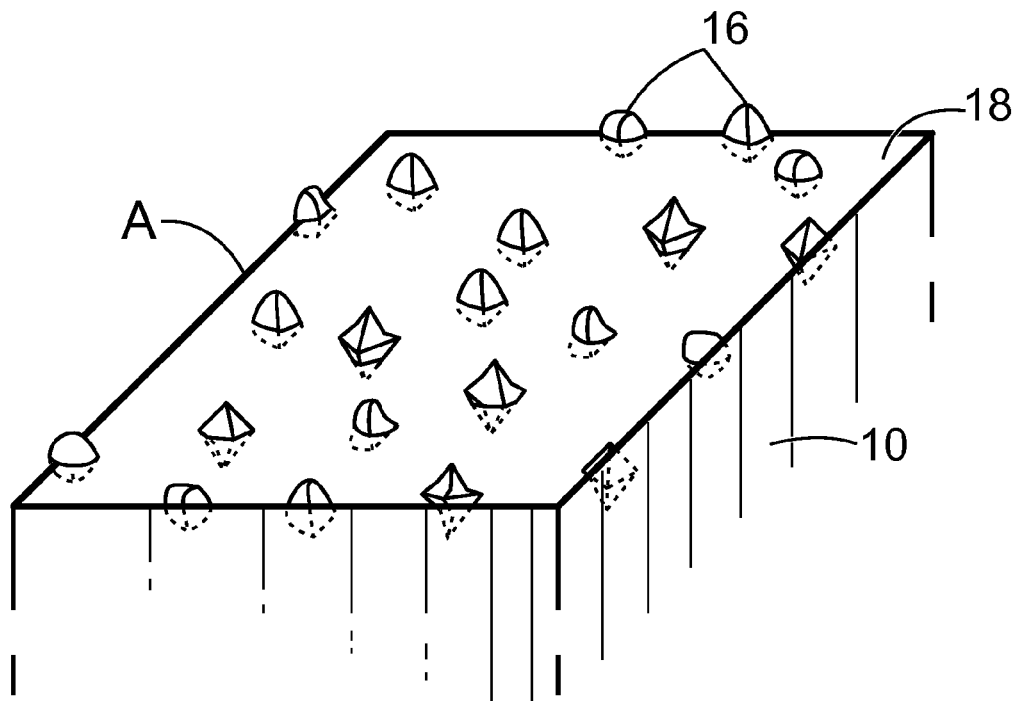
FIG. 5 is a schematic, magnified view of a substrate having a coating of flash-bonded, embedded, partially exposed particles in accordance with an aspect of the present invention.
Figure 6:
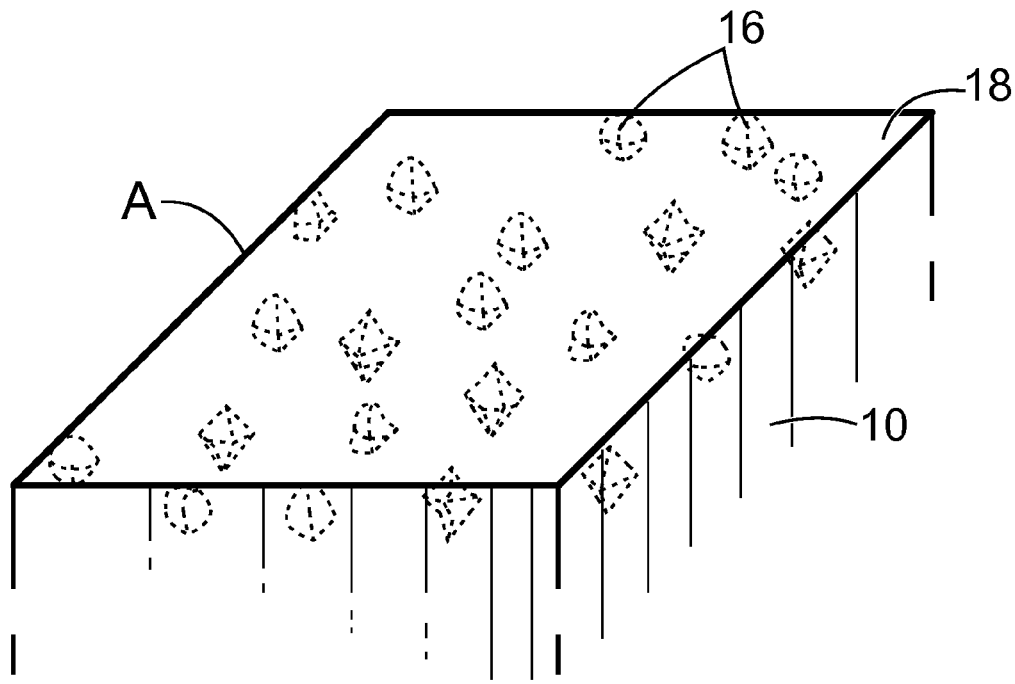
FIG. 6 is a schematic, magnified view of a substrate having a coating of flash-bonded, embedded particles in accordance with an aspect of the present invention.

FIGS. 5, 6 are magnifications representative of rectangle A of FIG. 4. FIG. 5 shows particles 16 partially embedded in the surface 18 of a substrate 10. FIG. 6 shows particles 16 fully embedded in the surface 18 of a substrate 10.

Another example of a flash bonding method is to heat the particles 16 to a temperature above the melting point of the substrate 10 and then apply the heated particles 16 to the surface 18. The heated particles 16 will locally melt the substrate 10 and become at least partially embedded into the surface 18 as shown in FIGS. 5, 6.

Figure 7:
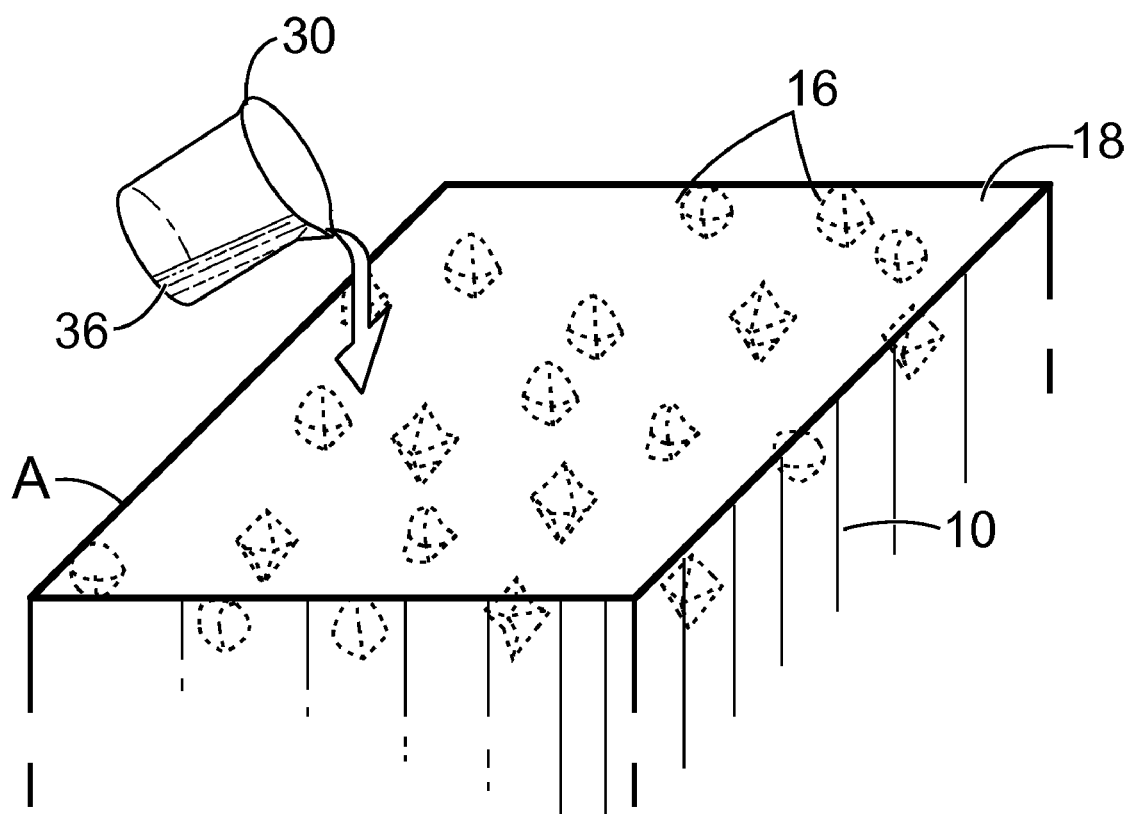
FIG. 7 is a schematic view of a substrate having embedded particles undergoing etching of the substrate to partially expose the embedded particles in accordance with an aspect of the present invention.

Referring to FIG. 7, in cases where the particles 16 are fully, or too deeply embedded in the surface 18 of a substrate 10, an etchant 36 can be applied to the surface 18 to etch the surface 18 sufficiently to expose the particles 16 as shown in FIG. 5. The etchant 36 can be applied by any conventional coating method, including but not limited to direct application from a container 30, spraying, painting, rolling, stamping, dip-coating, and the like.

The skilled artisan will recognize that the etching process must not be allowed to progress to the point where the particles 16 are loosened. Subsequently to the etching process, the particles 16 must remain firmly, although partially embedded in the surface 18 of a substrate 10.

Moreover, the skilled artisan will recognize that the composition of the etchant 36 is dependent upon the composition of the substrate 10. For example, a glass substrate would be etched by HF or HCl, and a polymeric substrate would be etched by an organic solvent.

The objective of flash bonding, and etching if necessary, are to produce a surface 18 with particles 16 that are firmly, although partially embedded in the surface 18 of a substrate 10. The skilled artisan will recognize that the particles 16 must be embedded in the surface 18 sufficiently deeply to minimize loss of particles during handling and use of the product. The skilled artisan will further recognize that the particles 16 must protrude from the surface 18 sufficiently to maximize the superhydrophobic quality of the product.

The surface 18 and partially embedded particles 16 are coated with a hydrophobic coating layer to make the surface superhydrophobic in accordance with the present invention. Methods and materials are fully described in the U.S. patent applications referenced hereinabove.

Articles made by the methods of the present invention are useful in many and various applications, including those disclosed in the U.S. patent referenced hereinabove.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of making a surface of an article superhydrophobic comprising:
   a. providing said article having at least one surface;
   b. applying to a surface a plurality of particles characterized by particle sizes ranging from at least 100 nm to about 10 µm, said particles being further characterized by a plurality of nanopores, wherein at least some of said nanopores provide flow through porosity, said particles being further characterized by a plurality of spaced apart nanostructured features comprising a contiguous, protrusive material;
   c. flash bonding said particles to said surface so that said particles are adherently bonded to, and partially embedded in, said surface wherein said flash bonding comprises melting or softening said surface; and
   d. applying a hydrophobic coating layer to said surface and said particles so that said hydrophobic coating layer conforms to said nanostructured features.

2. A method in accordance with claim 1 wherein said particles further comprise at least one recessing contiguous material interpenetrating with said protruding material.

3. A method in accordance with claim 2 wherein at least one of said materials comprises a glass.

4. A method in accordance with claim 1 further comprising an additional step of, after said flash bonding step and before said applying step, etching said surface to partially expose said at least partially embedded particles.

5. A method in accordance with claim 1 wherein said hydrophobic coating layer comprises a perfluorinated organic material.

6. A method in accordance with claim 1 wherein said hydrophobic coating layer forms a self-assembled monolayer.

7. A method of making a surface of an article superhydrophobic comprising:
   a. providing said article having at least one surface;
   b. applying to a surface a plurality of porous diatomaceous earth particles;
   c. flash bonding said porous diatomaceous earth particles to said surface so that said porous diatomaceous earth particles are adherently bonded to, and partially embedded in, said surface; and
   d. applying a hydrophobic coating layer to said surface and said porous diatomaceous earth particles so that said hydrophobic coating layer conforms to said surface and to said porous diatomaceous earth particles.

8. A method in accordance with claim 7 further comprising an additional step of, after said flash bonding step and before said applying step, etching said surface to partially expose said at least partially embedded porous diatomaceous earth particles.

9. A method in accordance with claim 7 wherein said hydrophobic coating layer comprises a perfluorinated organic material.

10. A method in accordance with claim 7 wherein said hydrophobic coating layer forms a self-assembled monolayer.

11. A method in accordance with claim 7 wherein said flash bonding comprises melting or softening said surface.

* * * * *